United States Patent
Gioia et al.

[15] 3,672,608
[45] June 27, 1972

[54] HYDRAULIC MECHANISM

[72] Inventors: Gaspare L. Gioia; Norris H. Switzer; John K. Willerton, all of Merritt Island, Fla.

[73] Assignee: Omniomics, Inc., Brevard County, Fla.

[22] Filed: April 10, 1970

[21] Appl. No.: 27,359

[52] U.S. Cl. ................................................. 244/43, 308/31
[51] Int. Cl. .......................................................... B64c 3/54
[58] Field of Search ...................... 244/43, 49, 45, 46, 85; 308/31, 32, 33

[56] References Cited

UNITED STATES PATENTS

| | | | |
|---|---|---|---|
| 3,525,306 | 8/1970 | Edel et al. | 105/149 X |
| 3,543,687 | 12/1970 | Ellzey | 105/149 X |
| 2,249,729 | 7/1941 | Fitzurka | 244/43 |
| 2,222,997 | 11/1940 | Bellanca et al. | 244/43 X |
| 2,260,316 | 10/1941 | Harris | 244/43 |
| 2,550,278 | 4/1951 | Makhonine | 244/43 |
| 2,929,582 | 3/1960 | Munro | 244/43 X |
| 3,083,935 | 4/1963 | Piasecki | 244/43 X |

Primary Examiner—Milton Buchler
Assistant Examiner—Carl A. Rutledge
Attorney—Beveridge & De Grandi

[57] ABSTRACT

A hydraulic mechanism for supporting a telescopically mounted wing section of an extendible aircraft wing. Hydraulic cylinders, fixedly attached to one telescopic wing section, are in slidable or rolling contact with the other wing section via pistons. Cylinders are mounted in inboard and outboard sections. In one embodiment, single groups of inboard and outboard cylinders are hydraulically interconnected with a hydraulic accumulator so as to provide load dispersion, wear adjustment and flutter dampening. In a second embodiment, such results are obtained by the interworking of different hydraulic circuits.

43 Claims, 10 Drawing Figures

INVENTORS
GASPARE L. GIOIA
NORRIS H. SWITZER
JOHN K. WILLERTON

BY
Beveridge & De Grandi
ATTORNEYS

HYDRAULIC MECHANISM

This invention relates to extendible aircraft wings and, more particularly, to hydraulic mechanisms for supporting telescopically extendible aircraft wings.

There is a need for aircraft wing structures which will provide sufficient lift at low speeds but not exhibit too high amounts of drag at high or supersonic speeds. A large wing can easily be built to provide virtually any low speed lift characteristics desired. Such a wing, however, would not only not be required at higher speeds, it would eventually become a liability as drag increased with speed.

Various designs have been made to meet this problem. One answer, representing at least a partial compromise, has been to provide a wing with a variable angle of attack. At low speeds, the wing is hinged upwardly, so as to maintain a reasonably horizontal fuselage, giving maximum visibility. At high speeds, the wing is angled to a more normal position relative to the fuselage. In this way, increased lift at low speeds is obtained by increasing the angle of attack rather than increasing wing area.

Other aircraft have been designed which utilize a high angle of attack at low speeds and provide a hingedly mounted cockpit section to provide increased visibility while in the high attack angle mode at low speeds.

Obviously, these two approaches are limited. Increased lift by increased angle of attack can only be obtained up to a point. In general, airfoils begin to lose lift at angles of attack above 20° to 25°. Accordingly, these approaches will not work for some combinations of specifications of low speed lift and high speed drag.

Another answer to this problem has been found in the "swing-wing" design. In this type of aircraft, effective wing lift and drag is varied by variably sweeping the wings from nearly perpendicular, low-speed, high lift, to very swept, high speed, low drag modes. Various disadvantages of swing-wing aircraft, however, have been found. For example, fatiguing of the pivoting mechanism has occurred. Also, during changes in wing position in this type of aircraft, major trim changes are necessary because of the shifting aircraft centers of gravity and lift.

The type of wing structure dealt with in this specification is an answer to the problem which has several inherent advantages over the designs noted above. This invention utilizes telescopically mounted wings, having an outer section attached to the fuselage and an inner section which may be extended from within the outer section. Specifically, this invention includes hydraulic mechanisms for supporting the inner wing and serving many other critical functions, such as absorbing shock, dispersing flight loads, dampening flutter, and so forth.

Accordingly, it is a primary object of this invention to provide a hydraulic mechanism for supporting telescopically mounted wing sections in an extendible aircraft wing.

It is another object of this invention to provide a hydraulic mechanism for an extendible wing aircraft which will dampen flutter encountered in flight.

It is still another object of this invention to provide a hydraulic mechanism for an extendible aircraft wing which will reduce manufacturing costs by enlarging acceptable manufacturing tolerances in various wing structures.

It is yet another object of this invention to provide a hydraulic mechanism for an extendible aircraft wing which will absorb both uneven manufacturing dimensions and changes in dimensions due to wear or temperature change or both.

It is a further object of this invention to provide a hydraulic mechanism for an extendible aircraft wing which will eliminate the need for wear adjustments.

It is a still further object of this invention to provide a hydraulic mechanism for an extendible aircraft wing which will provide a wing structure capable of constant reaction within the extreme temperature ranges of normal aircraft operation.

It is a still further object of this invention to provide an extendible wing support structure which will minimize friction loss between the two wing structures during extension and retraction of the extendible section.

It is a further object of this invention to provide aircraft wing structures which provide sufficient lift at low speeds and exhibit low amounts of drag at high or supersonic speeds.

It is yet another object of this invention to provide a simple hydraulic mechanism for dampening flutter created by upwardly directed turbulent forces.

It is yet a further object of this invention to provide a hydraulic mechanism for dampening flutter created by both upwardly and downwardly turbulent forces.

These and other objects of this invention will be readily understood by reference to the accompanying drawings, wherein.

In general, extendible, telescopically mounted aircraft wings have been long known in the art. Such structures previously known, however, are unacceptable for present use because of their general inability to withstand high wing loading and flutter encountered by modern aircraft.

It has been suggested in the prior art to mount such structures as are used in extendible aircraft wings by spring loaded devices. Springs are unacceptable for such uses because specifications of the springs would change as aircraft using them went through extreme operating temperature variations. Also, equal loading cannot be maintained at all points within a spring loaded structure since spring restoring force is a function of distortion. Finally, springs are disadvantageous for such applications because of permanent distortion and spring fatigue.

Figure 2:
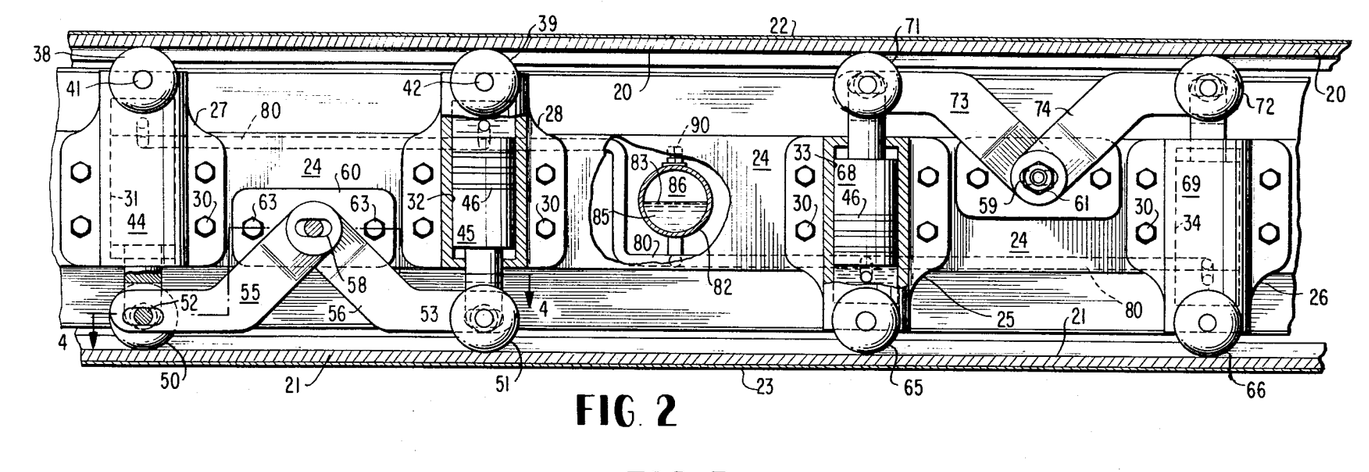
FIG. 2 is a view of the hydraulic assembly of one embodiment of this invention taken perpendicular to the major axes of the telescopically mounted wing sections.
Figure 3:
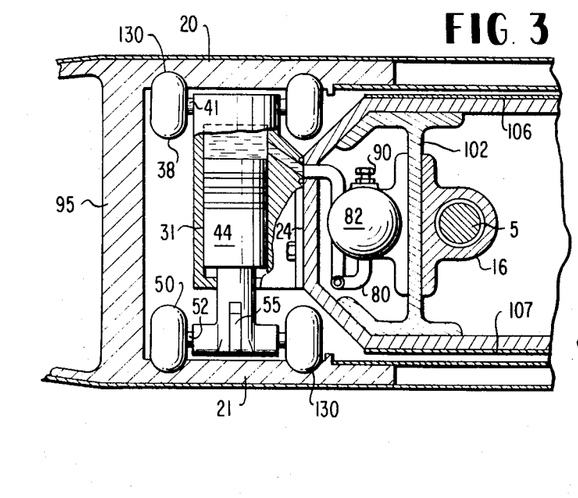
FIG. 3 is a view of the hydraulic assembly of one embodiment of this invention taken parallel to the major axes of the telescopically mounted wing sections, that is, perpendicular to the view of FIG. 2.
Figure 4:
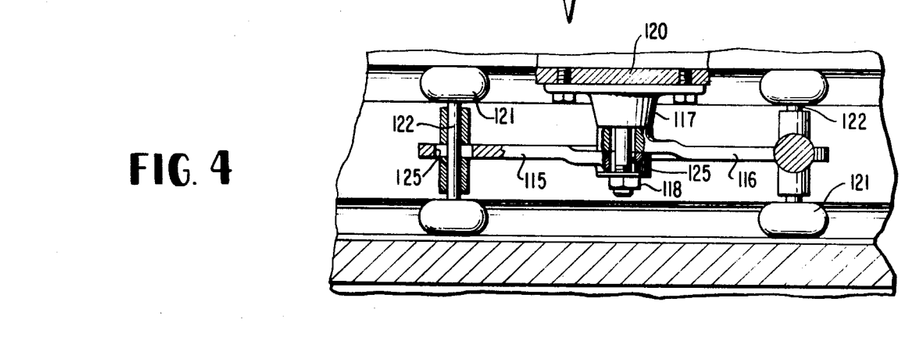
FIG. 4 is a detailed view of part of one embodiment of the hydraulic assembly according to this invention.

Two principal embodiments of this invention are disclosed herein. The first, shown in FIGS. 2, 3 and 4, provides for hydraulic dampening and load dispersion of vertically directed forces. That is, the first embodiment is only operative in response to upwardly directed turbulence. Some types of aircraft require only this type of mechanism.

The second embodiment of this invention is illustrated in FIGS. 5 through 10, inclusive. As will be discussed in detail below, it provides for hydraulic dampening and load dispersion of both upwardly and downwardly directed dynamic loads.

Figure 1:
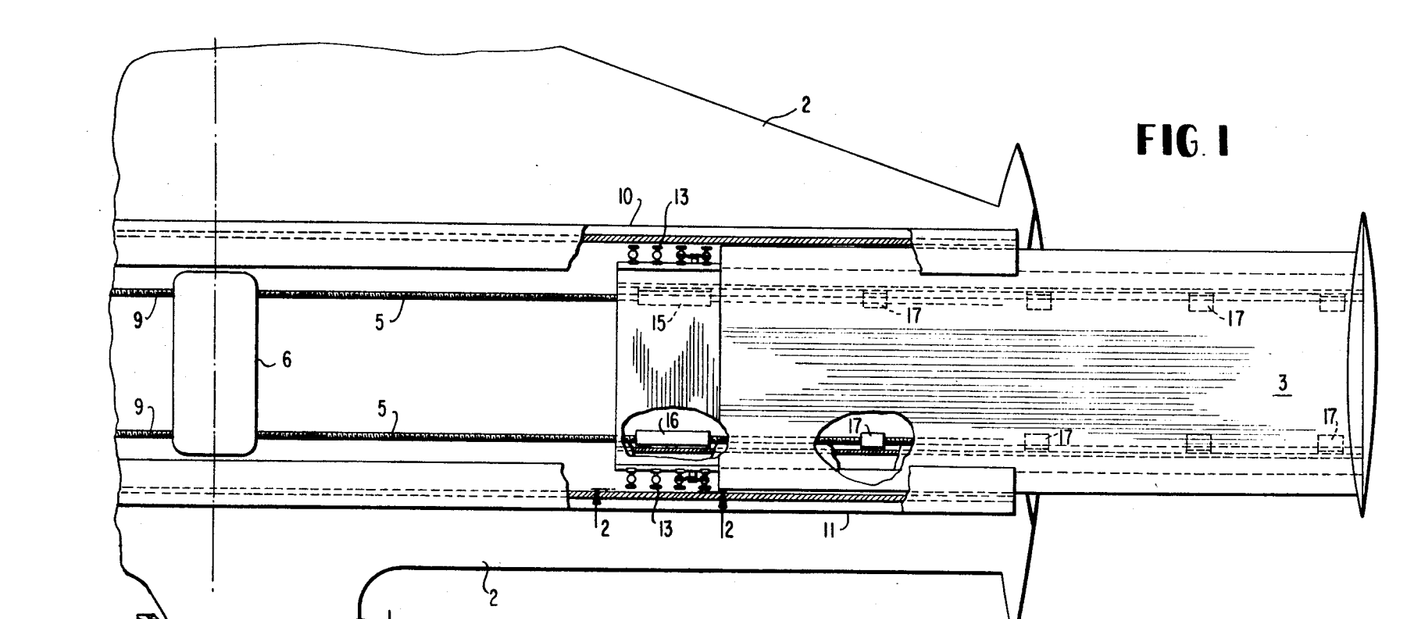
FIG. 1 illustrates incorporation of this invention in an extendible wing aircraft.

Referring to FIG. 1, the general relation of this invention to an aircraft comprising fuselage portion 1 and outer wing section 2 is shown. For purposes of illustration, the first embodiment of this invention is shown in connection with the wing of FIG. 1. Contained within the outer wing section 2 is inner wing section 3. Inner section 3 is extendible from within outer section 2 by means of screw jacks 5, powered by retraction and extension mechanism 6. Inner wing section 3 is illustrated in FIG. 1 in an approximately half-extended position. Further actuation of screw jacks 5 would extend inner section 3 to nearly its full length. On the opposite side of the aircraft, a second set of screw jacks 9, also operated by extension and retraction mechanism 6, similarly positions a corresponding inner wing section. Since potential lift and drag on both sides of the aircraft must be equal, the two sets of screw jacks always position the inner wing sections on opposite sides of the aircraft in corresponding positions.

Outer wing section 2 is primarily supported by channel shaped front spar 10 and similarly shaped rear spar 11. Both spars extend completely across the aircraft to opposite ends of the respective outer wing sections, and represent the major load bearing structure of the outer wing section.

Inner wing section 3 is, as will be explained in detail below, slidably mounted within the outer section 2 by means of sets of rollers, such as shown at 13. Opposing rollers, rigidly attached to the inner wing section, are arranged to roll against opposite inner faces of the channel shaped front and rear spars.

Also attached to inner wing section 3, as will also be explained in detail later, are screw jack housing assemblies 15, 16. As screw jacks 5 rotate, housing assemblies 15 and 16 serve to extend or retract inner wing section 3. It is noted that screw jacks 5 and 9 extend to near the end of each of the outer wing sections. In order to dampen potential screw jack oscillations, screw jack snubbers 17 are provided throughout the length of inner wing section 3. When inner wing section 3 is in its most extended position, none of the snubbers will be in contact with the screw jacks. When the wing is fully retracted, the screw jacks will be inserted through all of the snubbers 17.

Referring to FIG. 2, a view of the hydraulic assembly according to this invention is seen perpendicular to the major axes of the outer wing section and to the rear wing spar 11 of FIG. 1. Upper and lower parallel faces 20, 21 of the rear wing spar 11 are shown. Outer skin 22, 23 covers the spar sides and provides the surface of the wing.

As will be shown in detail in connection with the discussion of FIG. 3, inner wing section 3 is also provided with main spars contained within a box-shaped structure at their inboard end. Trailing edge 24 of this box structure may be seen in FIG. 2. Fixedly attached to the structure are outboard cylinder housings 25, 26 and inboard cylinder housings 27, 28. Each housing is bolted to the trailing edge 24 of box assembly 105 by bolts, such as shown at 30.

Contained within inboard and outboard cylinder housings are hydraulic cylinders 31, 32, 33 and 34. As may readily be appreciated, the hydraulic cylinders may be formed as part of the cylinder housings or as separate components welded thereto.

At the upper ends of inboard cylinder housings 27, 28, rollers 38, 39 are rotatively mounted via pins 41, 42. As will be illustrated in connection with the discussion of FIG. 3, pins 41, 42 actually carry a pair of rollers rather than the single rollers illustrated in FIG. 2. Rollers 38, 39 bear against the inner face of the top 20 of channel-shaped rear spar 11.

Contained within the inboard cylinders 31, 32 are pistons 44, 45. Each piston is provided with appropriate seals, such are as shown in piston 45 at 46.

At the lower end of pistons 44, 45 are rollers 50, 51, rotatively mounted by means of pins 52, 53. As above, the description of FIG. 3 will point out that pins 52, 53 mount two rollers, one at each end. Rollers 50, 51 bear against the inner face of the lower portion 21 of the channel-shaped spar 11.

Under some conditions of wing fluctuation, a problem may be encountered in ensuring that the cylinder rollers track properly. Two approaches are suggested herein. As will be described in connection with the first embodiment of this invention, pivot arms may be utilized for this purpose. An alternative approach, described in connection with the second embodiment, is to deepen the roller tracks.

Pivot arms 55, 56 are separably and rotatively mounted on pivot plate 60 by bolt 61. Plate 60 is, in turn, bolted to trailing edge 24 of the inner wing section box structure by bolts 63. Accordingly, each pivot arm 55, 56 is free to pivot about bolt 61.

Pivot arms 55, 56 are provided with slots 58, 59 at their opposite extremities. Pins 52, 53, mounting rollers 50, 51, pass through slots 58, 59. As will be readily appreciated, vertical travel of pistons 44, 45 cause pivot arms 55, 56 to pivot in opposite directions about bolt 61. Slots 58, 59 are provided to allow for travel of the outer ends of the arms in the vertical direction. As discussed above, the purpose of the pivot arm linkages is to permit rollers 50, 51 to travel over uneven surfaces caused by unequal manufacturing dimensions or wear and, most importantly, to ensure that the rollers track properly during extension and retraction of the inner wing sections.

In similar fashion, outboard hydraulic cylinder housings 25, 26 are provided with rollers 65, 66 which bear against lower face 21 of rear channel spar member 11. Pistons 68, 69 are also provided with rollers 70, 71 which bear against upper face 20 of the rear channel spar member. As in the inboard assembly, pivot arms 73, 74 ensure that rollers 71, 72 track properly during extension and retraction of the inner wing section.

It should be noted that the inboard and outboard hydraulic assemblies are oppositely positioned. That is pistons 44, 45 in the inboard assembly are facing downwardly in the drawing in FIG. 2, whereas outboard pistons 68, 69 face upwardly. The purpose of this arrangement will be discussed below. As will be pointed out in connection with the discussion of FIG. 3, a similar inboard and outboard hydraulic assembly is connected to the opposite side of the inner wing assembly and contacts the forward channel-shaped spar member. The forward inboard and outboard assemblies are positioned identically to their rear counterparts.

Manifold 80 connects the hydraulic portions of all of the inboard and outboard cylinders 31, 32, 33, 34 and the lower portion of hydraulic accumulator 82.

Accumulator 82 is a standard hydraulic accumulator fitted with a diaphragm 83 which separates the accumulator into two containers 85, 86. Container 85 contains hydraulic fluid and is connected to each of the hydraulic cylinders via manifold 80. Container 86 is, as will be explained below, used to contain gas under pressure.

Diaphragm 83 is a flexible diaphragm designed to maintain separation between containers 85 and 86 regardless of the pressure of the gas within the container 86.

Hydraulic pressure within the inboard and outboard cylinders may be determined by the pressure of the gas inserted in container 86. In order to ensure that no moisture leaks into the hydraulic system, the gas preferred for use with container 86 is dry nitrogen. Container 86 is provided within inlet valve 90 for the purpose of inserting gas to any pressure desired.

As may be readily seen, interconnection of the lower container 85 with the inboard and outboard hydraulic cylinders via manifold 80 ensures that the hydraulic pressure against all pistons will be equal under all load conditions. The maximum amount of this pressure may be determined by the gas pressure maintained in container 86.

Referring to FIG. 3, a view of the inner and outer wing sections is shown parallel to their major axes. As shown in FIG. 1, the section view of FIG. 3 is taken through the inboard hydraulic assembly on the trailing edge and the outboard assembly on the leading edge. The outer wing section is shown composed of rear channel spar member 95 and upper and lower channel parts 20, 21. Similarly, the forward or leading edge channel spar member 97 has upper and lower parallel portions 98, 99. As explained above, the forward and rearward spars 97, 95, in addition to serving as structures within which the inner wing section is mounted, also serve as the primary weight-bearing structures of the outer wing section.

The outer wing airfoil is formed of upper and lower coverings 22, 23. Similarly, the outer wing section is provided with inner wing coverings 100, 101.

Inner wing spar members 102, 103 provide the primary weight-bearing structures of the inner wing. Spars 102, 103 are contained at their inboard end within box assembly 105. Further, upper and lower portions of the inner wing airfoil are composed of covering sheets as on the outer wing, portions of which are shown at 106, 107.

The structures of FIG. 3 may be readily understood from the above description. The forward hydraulic assemblies which track within grooves 130 channel spar 97 are identical to those discussed above in connection with FIG. 2. As in the rear hydraulic system, each of the four forward cylinders is interconnected with a lower container of accumulator 112 via manifold 113. It may readily be seen, then, that hydraulic pressure in all four of the forward hydraulic cylinders is equal.

FIG. 4 illustrates the detail of one of the pivot arm mounting assemblies. Pivot arms 115, 116 are pivotally mounted on assembly plate 117 via bolts 118. In turn, assembly plate 117 is bolted to one of the outer end walls 120 of the inner wing box. Rollers 121 are mounted on pins 122 at the outer end of each of the pivot arms. Slot 125 is provided to allow vertical movement of the outer ends of the arms. As explained above, the purpose of pivot arms 115 and 116 is primarily to ensure proper tracking of rollers 121 during extension and retraction of the inner wing section.

Operation of this invention may best be explained by reference to FIG. 2. It may be readily seen that, by the inclusion of high pressure gas in container 86, each of the hydraulic pistons in the four cylinders are urged outwardly to bear against the upper and lower inside surfaces of the channel-shaped spar. In this way, zero tolerance is maintained at all times over changes in dimension due to any cause.

Principal among the various functions of this embodiment of the invention are shock absorption, flutter dampening, and load dispersion required in response to vertically directed loads. Operation of the hydraulic assemblies as a shock absorber may be understood by assuming that the inner wing structure in FIG. 2 passes through turbulent air and the portion to the right of FIG. 2 pivots upwardly. Rear face 24 of the inner wing section support box would then be at an angle with channel spar sections 20, 21 with the right side in FIG. 2 higher than the left side. This would cause the pistons in the four hydraulic cylinders to travel inwardly to varying degrees, serving as shock absorbers in well known fashion. As one or all of the pistons travel inwardly, diaphragm 83 is distorted upwardly, further compressing the gas in container 86 and raising the pressure of the gas and, thereby, the hydraulic pressure in the system. The inner wing section would continue to pivot upwardly until the resisting hydraulic pressure equalized the force created by the upward movement at which time the pivoting would cease. When the excessive upward pressure is removed from the inner wing, diaphragm 83 is restored to its original position by gas pressure in container 86 and the pistons returned to their original positions. In this way, a shock is absorbed and the wing section returned to its original position following the removal of excessive upward pressure. For many aircraft, shock absorption in only the upward direction is sufficient. For those applications requiring hydraulic response in both the upward and downward directions, the second embodiment, described below, is provided.

As the wing was pivoted upwardly in the above discussion, the resultant force within the rear channel spar was dispersed from a single pivot point to all four cylinders. This load dispersal if ensured by the interconnecting manifold and hydraulic accumulator which maintains hydraulic pressure in all of the cylinders equal. Accordingly, the force exerted by each cylinder and piston against opposite portions of the channel spar is equal in all cases. The total force created by the upward moment is thereby distributed to four points within the spar rather than the usual two which would be the case in a rigid, pivoting structure. The load at each point is, thereby, effectively halved.

Further load dispersion can be obtained by increasing the number of hydraulic cylinders in the inboard and outboard sections. While FIG. 2 illustrates the use of two cylinders each in the inboard and outboard sections, it is recognized that the numbers of such cylinders in the inboard and outboard section may be as high as load dispersal requirements dictate and, further, that the numbers of the inboard and outboard cylinders need not be equal. The load will be evenly distributed among all cylinders so long as the cylinders are hydraulically interconnected by the manifold and accumulator device. Since the pressure will equalize as soon as the hydraulic fluid flow has ceased, pressures are equalized almost immediately. Equalization speed is determined by the inside diameter of the manifold and the various hydraulic fittings. Load dispersion can be accomplished almost immediately by the use of a large inside diameter in the manifold.

Flutter is dampened in much the same fashion. As discussed above, an upward force on the inner wing section due to turbulent air immediately causes an increase in pressure within the hydraulic system and creation, thereby, of a restorative hydraulic force. Accordingly, air turbulence which causes a flutter, that is, an oscillation of the wing tip in a vertical direction, is offset by the rear and forward hydraulic assemblies. Hydraulic absorption of the energy introduced by the flutter results in the flutter being dampened.

It is recognized that the hydraulic assemblies may be changed in number and positioned differently within the outer wing section. It was suggested above that different numbers of inboard and outboard cylinder assemblies could be utilized. Similarly, the forward and rearward hydraulic assemblies could be combined into a single assembly located at the midportion of the inner wing section.

Many aircraft operate under conditions in which flutter need be cushioned and dampened in the upward direction only. For such aircraft operating under these conditions, the first embodiment herein is provided. Under some conditions, however, it is necessary that dampening and load dispersion be provided in both the upward and downward directions. The second embodiment of this invention provides this kind of action.

Figure 5:
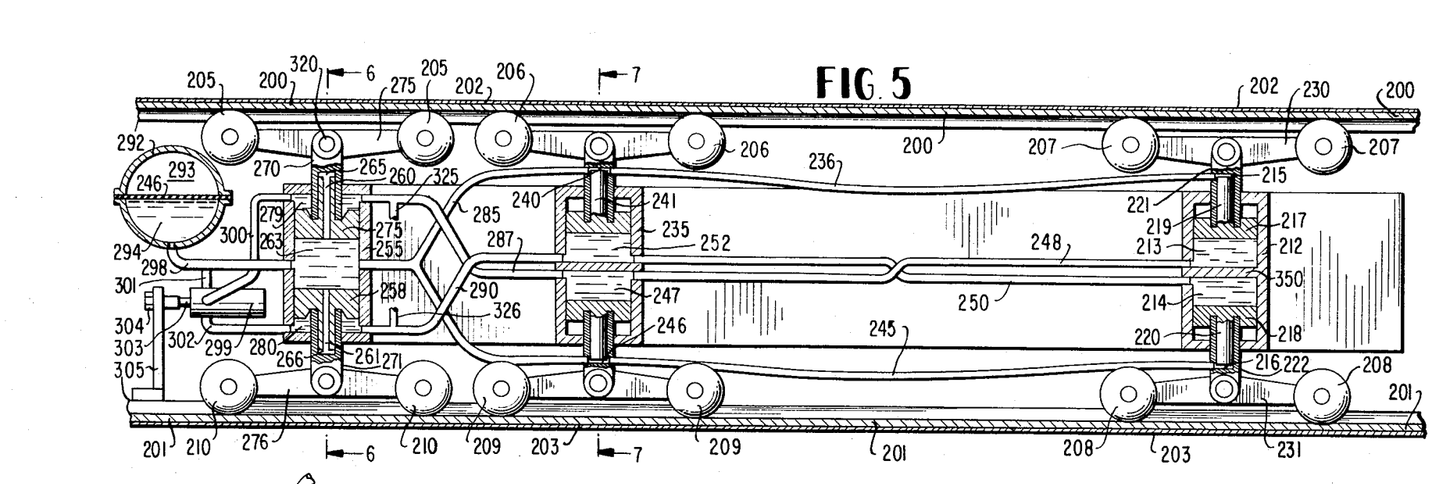
FIG. 5 is a view of the hydraulic assembly of a second embodiment of this invention taken perpendicular to the major axes of the telescopically mounted wing sections.

FIG. 5 illustrates the hydraulic system of the second embodiment when the inner wing is in a centered or neutral position. As in the first embodiment, upper and lower parallel sections 200, 201 of one of the cannel-shaped wing spars are shown. Outer skins 202, 203 cover the spar and provide the aerodynamic surface of the wing. As in the first embodiment, rollers 205, 206, 207, 208, 209 and 210 are urged outwardly by hydraulic assemblies against the inside parallel faces of the channel-shaped wing spar.

Two types of hydraulic assemblies are illustrated in FIG. 5. Each type will be described in detail. Hydraulic assembly 212 is provided with two major hydraulic chambers 213, 214 and two minor hydraulic chambers 215, 216. Major chambers 213 and 214 are separated by partition 350.

Upper and lower pistons 217, 218 of assembly 212 are mechanically free to travel in the vertical direction and are positioned by flow of hydraulic fluid, as will be explained below. Pistons 217, 218 are provided with stems 219, 220 which extend away from the center of assembly 212. Stems 219, 220 also serve as pistons, extending within roller cylinders 221, 222. The roller cylinders are also mechanically free to move within limits in the vertical direction. Each is provided with a roller arm 230 mounted at its outermost end. Roller arms 230, 231 rotatively mount rollers 207, 208. Details of the roller and roller arm mountings will be described in greater detail in connection with FIGS. 6 and 7.

To understand the operation of the second embodiment, the total degrees of freedom of the various parts of the hydraulic assemblies must be understood. Main pistons 217, 218 of assembly 212 are each free to move within limits in the upward and downward direction. The limits are substantially set by the mechanical dimensions of the cylinder in which they travel. Similarly, roller cylinders 221, 222 are also free to move in an upward and downward direction about the piston stems 219, 220 of the assembly pistons 217, 218. It will be appreciated that movement in this instance involves relative movement since, under some conditions, the pistons may remain stationary when one or both of the cylinders move.

A similar hydraulic assembly 235 is hydraulically connected to assembly 212 via manifold lines. Line 236 connects hydraulic chamber 215 in the outboard assembly with chamber 240 in the inboard cylinder. Accordingly, the hydraulic pressure acting downwardly upon stem pistons 219, 241 of the two hydraulic assemblies is equal. Similarly, line 245 interconnects lower chambers 216 and 246. As above, line 245 ensures that the hydraulic pressure in chambers 216 and 246 are equal. Main chamber 213 of hydraulic assembly 212 is connected to opposite chamber 247 of assembly 235 via manifold line 248. Accordingly, the hydraulic pressure in upper main chamber 213 of assembly 212 is identical to the pressure in the lower main chamber 247 of assembly 235. In the same fashion, line 250 connects the lower chamber 214 of assembly 218 with the upper main chamber 252 of assembly 235. Except for the inversion of the hydraulic manifold line connections, hydraulic assemblies 212 and 235 are identical.

Hydraulic assembly 255 is the second type utilized in this embodiment. As in the other type of cylinder, two pistons 257, 258 are mechanically unrestrained and free to move within limits in a vertical direction. As above, the mechanical limits are set by the mechanical dimensions of the system. The actual position of the pistons is, of course, determined by the hydraulic pressure in the various hydraulic circuits.

Each of the pistons 257, 258 of assembly 255 is provided with a bore 260, 261, the purpose of which is to hydraulically connect the main hydraulic chamber 263 with the smaller chambers 265, 266 located on the outer ends of the main piston stems.

As in the other cylinders, roller cylinders 270, 271 are set about the stems of the main pistons and are free to move in a vertical direction. Roller arms 275, 276 are mounted at the outer ends of the roller chambers as will be shown in connection with the discussion of FIGS. 6 and 7.

Inner faces of main pistons 257, 258 establish the upper and lower boundaries of hydraulic chamber 263. The opposite faces of each of the pistons 257, 258 face hydraulic chambers 279, 280. Accordingly, it may be seen that the exact position of pistons 257, 258 is determined by the hydraulic pressure in three separate hydraulic circuits: the circuit connected to chamber 263, the circuit connected to chamber 279 and the circuit connected to chamber 280.

It was explained that manifold lines 236 and 245 interconnect the outer hydraulic chambers of each of the outboard cylinders of FIG. 5. The chambers are hydraulically connected to each other and to chamber 263 by line 285. Line 287 interconnects chamber 247 with chamber 279 while line 290 interconnects chambers 252 and 280.

As in the first embodiment, hydraulic accumulator 292 is provided with upper and lower portions 293, 294. Portions 293 and 294 are separated by a flexible and impervious membrane 296. Upper portion 293 is provided with a valve (not shown) to provide filling with dry nitrogen to a desired pressure. Lower portion 294 is a hydraulic chamber and is connected to chamber 263 of hydraulic assembly 255 via manifold line 298.

It may be readily seen from the discussion of FIG. 5 that three separate hydraulic circuits are utilized. As will be explained below in connection with the discussions of FIGS. 9 and 10, it is desirable to equalize the pressure in the three circuits when the inner wing is in its inboard or fully retracted position. For this purpose, an equalization valve 299 is provided. The valve, which will be explained below in detail in connection with FIG. 8, interconnects the three hydraulic circuits via manifold lines 300, 301 and 302. Valve 299 is actuated by depression of the inner wing upon complete retraction of the inner wing. Stem 303 strikes against bolt 304, mounted within holder 305 which is in turn fastened to lower spar member 201.

The above discussion of FIG. 5 was provided to explain the mechanical structures of the system. The principles of operation will be described in connection with the discussions of FIGS. 9 and 10. As may readily be appreciated, certain standard parts of the hydraulic system have been deleted from FIG. 5 in the interests of clarity. For example, all the manifold lines and moving hydraulic parts would be provided with the usual gaskets and clamps.

Figure 6:
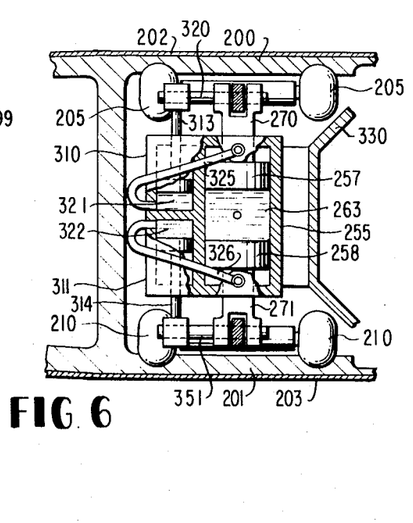
FIG. 6 is a detailed view of the accumulator cylinder utilized in the second embodiment of this invention.

FIG. 6 is a view of hydraulic assembly 255 taken along the section lines shown in FIG. 5. FIG. 6 illustrates the mounting of the roller arms on pistons 270 and 271 as well as auxiliary hydraulic cylinders 310, 311. Referring again to FIG. 5, it may be readily seen that if pistons 257 and 258 were to be forced inwardly due to an unevenness in the channel-shaped spar, hydraulic pressure in cylinder chamber 263 would be increased. However, at the same time, the volume of hydraulic chambers 279, 280 would increase, thereby decreasing hydraulic pressure in those two circuits. In order to ensure that the pressure drop does not take place, auxiliary hydraulic cylinders 310, 311 are provided. Cylinders 310, 311 are provided with hydraulic pistons 313, 314 which are connected at their outer ends to pins 320, 351. Accordingly, if pistons 270, 271 are forced inwardly by travel of rollers 205, 210, pistons 313, 314 also travel inwardly. Hydraulic fluid in chambers 321, 322 is forced into chambers 279, 280 by manifold lines 325, 326. Accordingly, cylinders 310, 311 will serve to maintain the original hydraulic pressure in chambers 279, 280 when pistons 257, 258 are forced inwardly due to unevenness in the channel-shaped spar member or for any other reason.

As discussed in connection with FIG. 3 and the first embodiment of this invention, the hydraulic system herein is mounted on box member 330 which comprises the inboard section of the inner wing. This structure may also be seen in FIG. 1.

Figure 7:
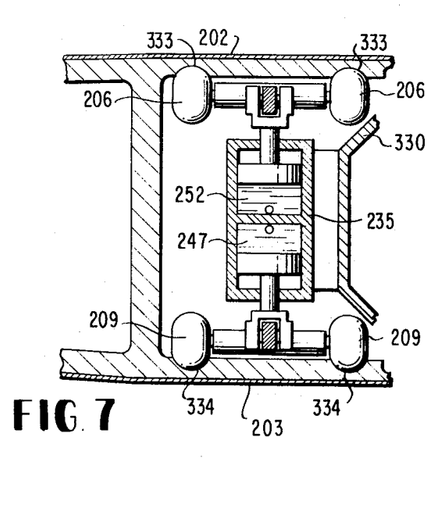
FIG. 7 is a detailed view of a hydraulic cylinder utilized in the second embodiment of this invention.

Referring to FIG. 7, a section view of hydraulic assembly 235 is shown along the line indicated in FIG. 5. As may be seen in that drawing, rollers 206, 209 track within the channel-shaped spar in grooves 333, 334. Hydraulic assembly 235 is rigidly attached to box member 330. As will be appreciated by one skilled in this art, structures supporting the rollers may take numerous forms. The three suggested herein are examples of such different forms.

Figure 8:
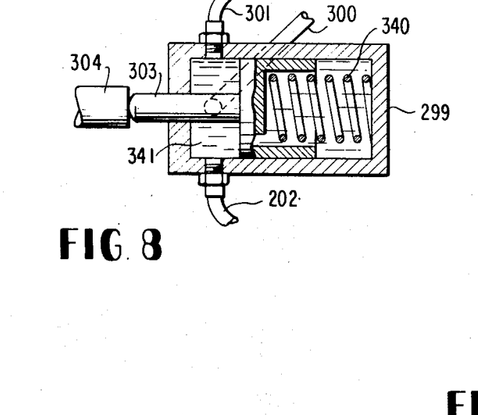
FIG. 8 is a detailed view of the pressure equalization valve utilized in the second embodiment of this invention.

As will be discussed in connection with the operation of the hydraulic circuits of the second embodiment of this invention in FIGS. 9 and 10, it is necessary to equalize hydraulic pressure in all three circuits when the inner wing is fully retracted. As discussed in connection with FIG. 5, valve 299 is provided for this purpose and is shown in detail in FIG. 8. Therein, it is seen that the valve is provided with slidable piston 303 which is urged to the left in the drawing by spring 340. When piston 303 is at its left-most position, the sides of the piston serve to block the ends of manifold lines 300, 301 and 302. The valve would be in this closed position at all times except when the inner wing is fully retracted. At that point, piston 303 strikes bolt 304 and is urged to the right. This serves to connect manifold lines 300, 301 and 302 to the common hydraulic chamber 341. As will be readily appreciated by those skilled in the art, the equalization valve could take any one of a number of forms. The design of FIG. 8 is primarily illustrative of the result which must be obtained.

Operation of the hydraulic assemblies of the second embodiment will be explained by reference to FIGS. 5, 9 and 10. Referring to FIG. 5, it is seen that three separate hydraulic circuits are present. The first circuit includes lower portion 294 of the accumulator, central chamber 263 of hydraulic assembly 255 and chambers 240, 246, 215 and 216 between the respective roller cylinders and the pistons of hydraulic assemblies 235 and 212. The second hydraulic circuit connects chambers 279 of assembly 255, chamber 247 of assembly 235 and chamber 213 of assembly 212. Similarly, the third hydraulic circuit connects chamber 280 of assembly 255, chamber 252 of assembly 235 and chamber 214 of assembly 212. As in the first embodiment, dry nitrogen or any other suitable gas is introduced into the upper portion 293 of accumulator 292 to establish the hydraulic pressure in the lower chamber of the accumulator. Since, as explained in connection with FIG. 8, the three circuits are interconnected by valve 299 when the inner wing is in its retracted position, gas pressure in the accumulator 292 establishes equal hydraulic pressure in each of the three circuits. Under these conditions, the various hydraulic assemblies assume the positions shown in FIG. 5.

Figure 9:
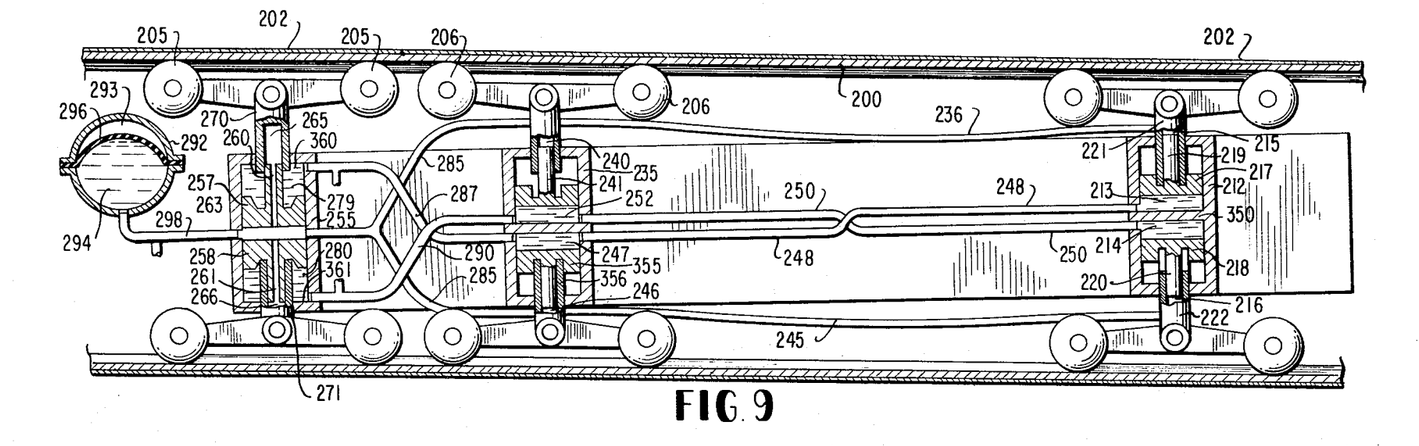
FIG. 9 is a view illustrating operation of the second embodiment of this invention after undergoing an upward deflection; and, FIG. 10 is a view illustrating operation of the second embodiment of this invention after undergoing a downward deflection.

When an upward force is exerted on the extended inner wing, as, for example, by upwardly directed turbulence, the inner and outer wings assume the relative position shown in FIG. 9. To explain the operation of the second embodiment of this invention, operation of the three hydraulic circuits will be examined.

Application of an upwardly directed force on the extended inner wing changes the configuration from that of FIG. 5 to that of FIG. 9. As the outer end of the inner wing pivots upwardly, assembly 212 moves in an upward direction. Roller cylinder 221 causes piston 217 to retain its original position, thereby reducing the volume of chamber 213, expelling hydraulic fluid through manifold line 248. Since piston 217 and roller cylinder 221 were in contact when the inner wing was in its centered or neutral position, they undergo no movement relative to each other during the change to the configuration of FIG. 9. Accordingly, the volume of chamber 215 remains unchanged.

As the outer end of the inner wing pivots upwardly, the inboard end, and hydraulic assemblies 255 and 235, move downwardly. Roller cylinder 356 and piston 255 remain in their previous position as assembly 235 moves downwardly, serving to decrease the volume of chamber 247.

Chambers 213 and 247 are interconnected by manifold lines 248. Since their volumes are decreased, the hydraulic fluid is forced into chamber 279 via manifold line 287. The increased hydraulic pressure in the circuit forces piston 257 downwardly, increasing the volume of chamber 279 and decreasing the volume of chamber 263. As the inboard end of the inner wing pivots downwardly to the position shown in FIG. 9, hydraulic assembly 255 is also moved downwardly with respect to piston 258. Roller cylinder 271 and piston 258 were in contact in the neutral position so that no relative movement between them can take place. The relative movement of piston 258 and assembly 255 causes the volume of chamber 263 to further decrease and the volume of chamber 280 to increase.

As the volume of chamber 280 increases, fluid is withdrawn from chambers 252 and 214, allowing their volumes to decrease. As will be explained in connection with the accumulator circuit, pistons 241 and 220 are urged toward the center of their respective assemblies as the volumes of chambers 252 and 214 decrease.

A small portion of the hydraulic fluid expelled from chamber 263 flows in or through roller chambers 240, 246, 215 and 216 over manifold lines 285, 236 and 245. The total downward force against piston 355 and the upward force against piston 217 is greater than the opposing forces created by hydraulic pressure in chambers 246 and 215 due to the difference of opposing piston areas. Accordingly, roller cylinders 221 and 356 do not move relative to their corresponding pistons. The volumes of chambers 246 and 215 remain, therefore, unchanged.

Since the volume of chamber 280 increases, however, the hydraulic force in roller chambers 240 and 216 exceeds the opposing forces in chambers 252 and 214. This causes pistons 241 and 220 to travel inwardly, absorbing the decrease in volumes of chambers 252 and 214 following the volume increase in chamber 280.

While some of the fluid expelled from chamber 263 is drawn into the roller cylinder chambers, the majority of the fluid flows into chamber 294 of accumulator 292, causing an upward deflection of membrane 296 and a decrease in volume of gas chamber 293. As the membrane is deflected, the pressure in the gas chamber increases. Accordingly, as in the first embodiment, increased deflections of the inner wing cause an increasing gas pressure within the upper chamber of the accumulator.

As the gas pressure in chamber 293 increases, so does the hydraulic pressure in accumulator chamber 294 and assembly chambers 263, 279, 247 and 213. The wing deflection may continue until the induced accumulator pressure which rises in opposition creates hydraulic forces which equal the deflecting force. It may be seen, therefore, that an upward deflection is hydraulically cushioned. Further, the load against the spar members is distributed through a number of points rather than the two points which would be the case in a rigid system.

Restoration of the deflected inner wing to its original centered position may be understood by consideration of the force vectors created by various hydraulic pressures in the three hydraulic circuits. Referring to FIG. 9, it was explained above that the pressure in chamber 263 was increased to equal the pressure in the accumulator hydraulic chamber 294. Since piston 257 is free to travel in a vertical direction, it will assume a position determined by the pressure in chambers 263 and 279. Since the opposing areas of piston 255 are approximately equal, the hydraulic pressure in chambers 263 and 279 are also approximately equal. For the purposes of this explanation, the pressure in chambers 263 and 279 will be arbitrarily assigned a value of 100 units. Accordingly, the hydraulic pressure in chambers 247 and 213 is also 100 units.

Piston 258, however, is positioned by the mechanical travel of the wing. The circuit consisting of chambers 280, 252 and 214 is at a lower pressure than the other two circuits. This may be recognized in the action of piston 218 of assembly 212. Piston 218 is free, in FIG. 9, to travel in a vertical direction. Since it has reached an equilibrium position, the upward and downward forces on it are equal. Pressure in chamber 216 has been arbitrarily assigned 100 units. The pressure in chamber 214 is related to the pressure in chamber 216 as are the opposing piston areas. Accordingly, it may be seen that the pressure exerting a force downwardly is much less than the upward pressure in chamber 216. For purposes of this explanation, pressure in the circuit connecting chambers 214, 252 and 280 will be arbitrarily assigned a value of 30 units.

Assembly 255, attached to the inboard end of the inner wing box, has, then, two relevant forces acting on it. There is an upward force against top face 360 caused by the 100 units of pressure in chamber 279. There is a downward force against lower face 361 caused by the 30 units of pressure in chamber 280. Since the areas of faces 360 and 361 are equal, the upward force exceeds the downward force by a ratio equal to that of the pressures, 100 to 30, in the above example. The inboard end of the inner wing is accordingly urged in an upward direction in FIG. 9.

Similarly, 100 units of pressure in chamber 213 is opposed by 30 units in chamber 214. Since the opposing areas of opposite sides of partition 350 are equal, the downward force exceeds the upward by a ratio equal to that of the corresponding pressures, 100 units to 30 units, in the above example. Therefore, a net downward force is exerted against assembly 212.

It may be readily seen that the opposite forces on assemblies 255 and 212 add to produce a clockwise moment in FIG. 9. This moment returns the wing to its original, undeflected position when the original deflecting force is removed.

The above analysis may be quickly applied to assembly 235 and further hydraulic assemblies that may be added to the system. As explained, the net result of the system is a clockwise moment which tends to cancel counterclockwise movement of the inner wing caused by upward deflection.

Figure 10:
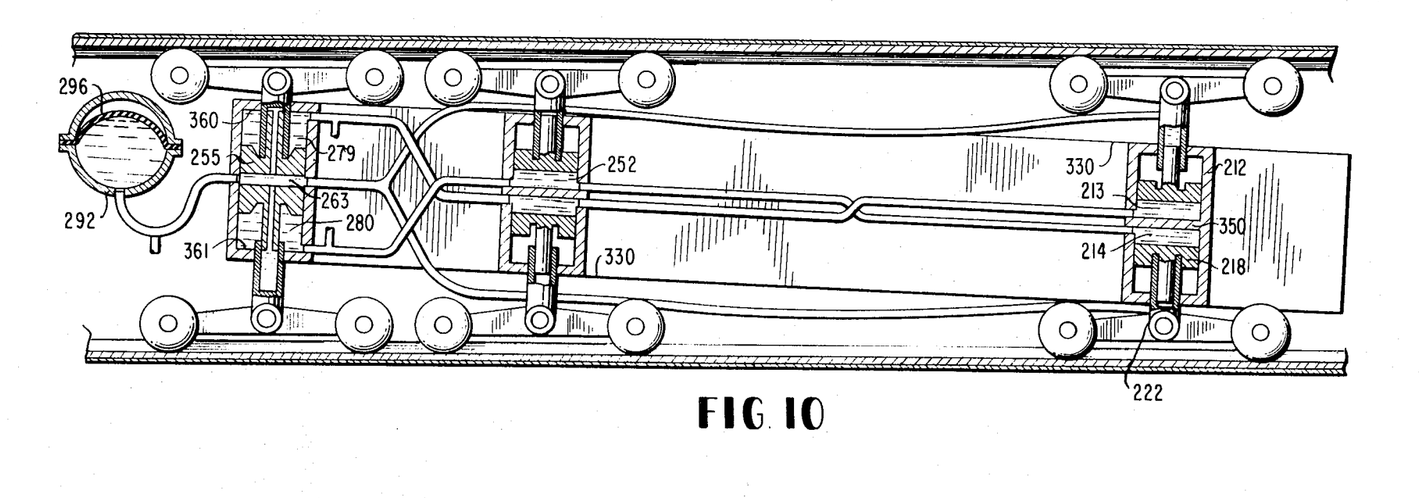

FIG. 10 illustrates the action of the hydraulic assemblies of the second embodiment when the inner wing undergoes a downward deflection due to turbulence. As shown in the drawing, wing box 330 has been moved through a clockwise arc by downwardly directed turbulence. The cushioning takes place as described in connection with FIG. 9 except that different hydraulic circuits are involved. The high pressure circuits includes chambers 214, 252 and 280. As above, the change in configuration causes an upward deflection of membrane 296 of accumulator 292. As a result, increasing deflections are met and cancelled by increased hydraulic pressure in chambers 263, 280, 252 and 214.

Restoration also takes place as described above. Pressure in chamber 214 is greater than the pressure in chamber 213 of assembly 212. The resultant forces acting upon partition 350 tend to move assembly 212 in an upward direction.

At the same time, pressure differences in chambers 279 and 280 result in a greater force being applied against lower face 361 of assembly 255 than upper face 360. A net downward force, therefore, acts on assembly 255. This downward force combines with the upward force on the assembly 212 to produce a counterclockwise moment which tends to restore the inner wing to its original neutral position.

It may be seen then, that the second embodiment of this invention will cushion and dampen oscillations due to air turbulence in both an upward and downward direction. Additionally, this invention will serve to spread the loads caused by such deflections over a plurality of points.

As appreciated by any person skilled in the art, various materials may be utilized for different portions of the hydraulic end wing assemblies. The following suggested materials are preferred but are not the only materials capable of use.

Manifolds interconnecting the hydraulic assembly may be fabricated from 6,000 p.s.i. stainless steel. Such lines have heavy wall construction and are fabricated using brazed fittings and the application of B-nuts.

Hydraulic cylinders may be fabricated from different types of steel. The outer chamber and attachment portions of the cylinder assemblies may be fabricated from 4360 or 5000 series steel. It is preferred that the inner chamber be porous chromed after proper heat treatment. Cylinder pistons may be fabricated from 4130 steel and hard chromed after heat treatment.

Chevron seals will be utilized to reduce bleed through of the hydraulic fluid.

It is preferred that roller bearing assemblies be fabricated from 5000 series steel, properly heat treated.

As appreciated by any person skilled in the art many changes in the detailed design of this device may be made without departing from the invention. Moreover, this invention may be used in many applications other than aircraft wings. For example, it may be used to maintain a predetermined angular relationship between any two bodies. It is intended that the invention be limited only by the appended claims.

What we claim is:

1. In an extendible aircraft wing having an outer wing section and an inner wing section telescopically extendible therefrom along a longitudinal wing axis, interconnecting support means comprising,
   rail means extending along one of the wing portions,
   hydraulic means connected to the other of said wing portions, said hydraulic means comprising,
      inboard hydraulic cylinder means,
      outboard hydraulic cylinder means longitudinally spaced from the inboard hydraulic cylinder means,
      at least one contact means connected to each of said cylinder means for movably contacting said rail means, said contact means being movable in a direction transverse to the longitudinal wing axis under the influence of its associated hydraulic cylinder,
      and, interconnecting means hydraulically connecting certain of said inboard and outboard cylinder means for conducting hydraulic fluid flow therebetween.

2. The extendible aircraft wing of claim 1, wherein,
   said rail means extends within said outer wing section, and,
   said hydraulic means is connected to the inboard end of said inner wing section.

3. The extendible aircraft wing of claim 1, wherein,
   each of the inboard and outboard hydraulic cylinder means comprises
      a hydraulic cylinder fixedly attached to said inner wing section, and
      at least one piston means movably contained within each of said hydraulic cylinder means,
   and, said contact means is connected to the free end of each of said pistons for movably contacting said rail means.

4. The extendible aircraft wing of claim 1,
   wherein said interconnecting means comprises
      manifold means hydraulically interconnecting all of said hydraulic cylinder means, and
      accumulator means hydraulically connected to said manifold means.

5. The extendible aircraft wing of claim 4, wherein said accumulator means comprises
      first container means hydraulically connected to said manifold means,
      second container means for enclosing gas at a predetermined pressure, and,
      diaphragm means within said accumulator means for separating said first and second container means.

6. The extendible aircraft wing of claim 1, wherein
      said rail means comprises at least one channel-shaped rail extending within said outer wing section and parallel to the major axis of said section, and
      said contact means movably contacts at least one of the parallel sides of said channel-shaped rail.

7. The extendible aircraft wing of claim 6, wherein
      said hydraulic means is connected to the inboard end of said inner wing section,
      each of said inboard and outboard hydraulic cylinder means comprises
         a hydraulic cylinder fixedly attached to said inner wing section, and
         at least one piston means movably contained within each of said hydraulic cylinders, and
      wherein said contact means is connected to the free end of each of said piston means of each of said hydraulic cylinder means.

8. The extendible aircraft wing of claim 1, wherein said interconnecting means comprises
      manifold means hydraulically interconnecting all of said hydraulic cylinder means, and
      accumulator means hydraulically connected to said manifold means.

9. The extendible aircraft wing of claim 8, wherein said accumulator means comprises
      first container means hydraulically connected to said manifold means,
      second container means for enclosing gas at a predetermined pressure, and,
      diaphragm means within said accumulator means for separating said first and second container means.

10. The extendible aircraft wing of claim 9, wherein said accumulator means further comprises
      valve means connected to said second container means for varying the pressure of said gas.

11. The extendible aircraft wing of claim 7, wherein said contact means comprises
      first roller means connected to the free end of said piston and second roller means connected to the opposite end of said hydraulic cylinder, said first and second roller means contacting opposite parallel sides of said channel-shaped rail.

12. The extendible aircraft wing of claim 11, further comprising
      means for maintaining the rotational axes of said roller means perpendicular to the major axis of said section.

13. The extendible aircraft wing of claim 12, where the number of inboard hydraulic cylinder means is equal to the number of outboard hydraulic cylinder means.

14. The extendible aircraft wing of claim 1, wherein said hydraulic means further comprises,
      third hydraulic cylinder means, and
      second interconnecting means hydraulically connecting said third hydraulic means with said inboard and outboard hydraulic cylinder means.

15. The extendible aircraft wing of claim 14, wherein said third hydraulic cylinder means comprises,
a first hydraulic chamber,
a second hydraulic chamber, and
wherein said interconnecting means hydraulically connects said first chamber with certain of said inboard and outboard cylinder means and said second chamber with certain other of said inboard and outboard cylinder means.

16. The extendible aircraft wing of claim 15,
wherein said third hydraulic cylinder means further comprises
a third hydraulic chamber intermediate said first and second chambers and separated therefrom by first and second piston means, and,
accumulator means hydraulically connected to said third hydraulic chamber.

17. The extendible aircraft wing of claim 16,
wherein each of said inboard and outboard cylinder means comprises first and second hydraulic chambers, each chamber including a piston.

18. The extendible aircraft wing of claim 17,
wherein said contact means is connected by hydraulic expansion means to the free end of each of said pistons for movably contacting said rail means.

19. The extendible aircraft wing of claim 18,
wherein said hydraulic expansion means comprises a hydraulic chamber defined by a hydraulic cylinder connected to said contact means and the free end of said pistons.

20. The extendible aircraft wing of claim 19, wherein said interconnecting means hydraulically interconnects the chambers of said expansion means with said third hydraulic chamber.

21. In an extendible aircraft wing having an outer wing section and an inner wing section telescopically extendible therefrom along a longitudinal wing axis, interconnecting support means comprising,
inboard hydraulic means fixedly attached to one wing section and in movable contact with the other wing section, said inboard hydraulic means being operable in a direction transverse to the longitudinal wing axis,
outboard hydraulic means fixedly attached to one wing section and in movable contact with the other wing section, said outboard hydraulic means being operable in a direction transverse to the longitudinal wing axis, and being longitudinally spaced from the inboard hydraulic means, and
interconnecting means hydraulically connecting certain of said inboard and outboard hydraulic means for conducting hydraulic fluid flow therebetween.

22. The extendible aircraft wing of claim 21,
further comprising,
third hydraulic means, and
wherein said interconnecting means is also connected to said third hydraulic means.

23. The extendible aircraft wing of claim 22,
wherein said third hydraulic means comprises,
a first hydraulic chamber,
a second hydraulic chamber, and
wherein said interconnecting means hydraulically connects said first chamber with certain of said inboard and outboard hydraulic means and said second chamber with certain other of said inboard and outboard cylinder means.

24. The extendible aircraft wing of claim 23,
wherein said third hydraulic cylinder means further comprises,
a third hydraulic chamber intermediate said first and second chambers and separated therefrom by first and second piston means, and
accumulator means hydraulically connected to said third hydraulic chamber.

25. The extendible aircraft wing of claim 21, wherein said interconnecting means comprises
manifold means hydraulically interconnecting said inboard and outboard hydraulic means, and
accumulator means hydraulically connected to said manifold means.

26. The extendible aircraft wing of claim 22, wherein said accumulator means comprises
first container means hydraulically connected to said manifold means,
second container means for enclosing gas at a predetermined pressure, and,
diaphragm means within said accumulator means for separating said first and second container means.

27. The extendible aircraft wing of claim 26, further comprising
valve means connected to said second container means for varying the pressure of said gas.

28. The extendible aircraft wing of claim 21,
wherein said inboard and outboard hydraulic means are fixedly attached to said inner wing section and in movable contact with said outer wing sections, and
further comprising contact means connected to said hydraulic means for maintaining said movable contact with said outer wing section.

29. The extendible aircraft wing of claim 28,
wherein said contact means comprises roller means bearing against a surface of said outer wing section, and,
means for maintaining the rotational axes of said roller means perpendicular to the major axis of said wing section.

30. In an extendible aircraft wing having an outer wing section and an inner wing section telescopically extendible therefrom along a longitudinal wing axis,
at least two channel-shaped beams attached within said outer wing section and extending parallel to the major axis of said outer wing section,
a plurality of pairs of longitudinally spaced hydraulic means operable in directions transverse to the longitudinal wing axis, each pair having an inboard portion and an outboard portion, all pairs fixedly connected to said inner wing section and each pair in movable contact with a single one of said channel-shaped beams, and
a plurality of hydraulic interconnecting means, one such means hydraulically interconnecting inboard and outboard portions of each pair of hydraulic means.

31. The extendible aircraft wing of claim 30, wherein said interconnecting means comprises
manifold means hydraulically interconnecting all of said hydraulic cylinder means, and
accumulator means hydraulically connected to said manifold means.

32. The extendible aircraft wing of claim 31, wherein said accumulator means comprises
first container means hydraulically connected to said manifold means,
second container means for enclosing gas at a predetermined pressure, and,
diaphragm means within said accumulator means for separating said first and second container means.

33. The extendible aircraft wing of claim 32,
further comprising valve means connected to said second container means for varying the pressure of said gas.

34. An extendible aircraft wing having
an outer wing section having a major axis,
an inner wing section having a major axis and being received in the outer wing section,
means for extending and retracting the inner wing section,
inboard hydraulic means operable between the inner and outer wing sections, said inboard hydraulic means having a neutral position and being movable to displaced positions in either direction transverse to the major axes of the wing sections when subjected to forces thereby permitting relative displacement of the respective wing sections in a direction transverse to their major axes,
outboard hydraulic means operable between the inner and outer wing sections, said outboard hydraulic means having a neutral position and being movable to displaced positions in either direction transverse to the major axes of the wing sections when subjected to forces, said inboard and outboard hydraulic means being movable in opposite directions from their neutral position when the inner wing section is subjected to flight conditions, and means for restoring the hydraulic means to their neutral positions.

35. The extendible aircraft wing of claim 34 wherein the means for restoring the hydraulic means to their neutral positions includes an accumulator vessel containing a compressible fluid, means for reducing the volume of the compressible fluid in response to the force-imposed relative displacement of the respective wing sections in a direction transverse to their major axes; whereby the compressible fluid will return to its original volume and restore the hydraulic means to their neutral positions upon relaxation of said forces.

36. The extendible aircraft wing of claim 34 wherein the inboard hydraulic means has an upper piston movable in an upper cylinder and a lower piston movable in a lower cylinder, said outboard hydraulic means having an upper piston movable in an upper cylinder and a lower piston movable in a lower cylinder, means hydraulically connecting a first pair of said cylinders which includes the lower cylinder of the outboard hydraulic means and the upper cylinder of the inboard hydraulic means, means hydraulically connecting a second pair of said cylinders which includes the upper cylinder of the outboard hydraulic means and the lower cylinder of the inboard hydraulic means.

37. The extendible aircraft wing of claim 36 having a trackway connected to and lying within one wing section, roller means associated with each of said pistons and bearing on the trackway when the wing sections are in said neutral position, and means for urging each of said rollers against its associated trackway upon movement of its said piston away from said trackway upon relative displacement of the respective wing sections in a direction transverse to their major axes.

38. The extendible aircraft wing of claim 36 having means for withdrawing hydraulic fluid from the first pair of cylinders in response to upward relative displacement of the extended portion of the inner wing section, and means for withdrawing hydraulic fluid from the second pair of cylinders in response to downward relative displacement of the extended portion of the inner wing section.

39. The extendible aircraft wing of claim 38 having a trackway connected to and lying within one wing section, roller means associated with each of said pistons and bearing on the trackway when the wing sections are in said neutral position, and means for urging each of said rollers against its associated trackway upon movement of its said piston away from said trackway upon relative displacement of the respective wing sections in a direction transverse to their major axes.

40. The extendible aircraft wing of claim 38 wherein the means for restoring the hydraulic means to their neutral positions includes compressible fluid means for exerting fluid pressure within the first pair of cylinders when the extended portion of the inner wing section is displaced downwardly and for exerting fluid pressure within the second pair of cylinders when the extended portion of the inner wing section is displaced upwardly.

41. The extendible aircraft wing of claim 40 having means for increasing the pressure generated by the compressible fluid means in response to relative displacement of the respective wing sections in a direction transverse to their major axes.

42. The extendible aircraft wing of claim 40 having a trackway connected to and lying within one wing section, roller means associated with each of said pistons and bearing on the trackway when the wing sections are in said neutral position, and means for urging each of said rollers against its associated trackway upon movement of its said piston away from said trackway upon relative displacement of the respective wing sections in a direction transverse to their major axes.

43. The extendible aircraft wing of claim 42 wherein the means for urging each of said rollers against its associated trackway is an extensible hydraulic unit which connects each said piston with its respective roller and is provided with an hydraulic fluid chamber, and means for exerting the pressure of said compressible fluid means within the hydraulic fluid chambers of the extensible hydraulic units.

* * * * *